(12) United States Patent
Kunz et al.

(10) Patent No.: US 9,382,405 B2
(45) Date of Patent: Jul. 5, 2016

(54) PEROXIDE BLENDS FOR CROSS-LINKING ETHYLENE VINYL ACETATE IN AN ACCELERATED MANNER

(75) Inventors: Martin Kunz, Dettenhausen (DE); Katharina Seitz, Munich (DE); Iris Nagl, Munich (DE)

(73) Assignee: UNITED INITIATORS GMBH & CO. KG, Pullach (DE)

(*) Notice: Subject to any disclaimer, the term of this patent is extended or adjusted under 35 U.S.C. 154(b) by 397 days.

(21) Appl. No.: 13/981,359

(22) PCT Filed: Jan. 31, 2012

(86) PCT No.: PCT/EP2012/051555
§ 371 (c)(1),
(2), (4) Date: Jul. 24, 2013

(87) PCT Pub. No.: WO2012/104298
PCT Pub. Date: Aug. 9, 2012

(65) Prior Publication Data
US 2013/0309800 A1    Nov. 21, 2013

(30) Foreign Application Priority Data

Jan. 31, 2011   (DE) .................. 10 2011 003 382

(51) Int. Cl.
*C08K 5/14*    (2006.01)
*C08K 5/00*    (2006.01)

(52) U.S. Cl.
CPC ............... *C08K 5/14* (2013.01); *C08K 5/0025* (2013.01)

(58) Field of Classification Search
CPC ............................ C08K 5/0025; C08K 5/14
USPC ................. 525/330.3; 438/64; 252/182.28
See application file for complete search history.

(56) References Cited

U.S. PATENT DOCUMENTS

| | | | |
|---|---|---|---|
| 4,278,558 A | 7/1981 | Smith et al. | |
| 4,804,775 A * | 2/1989 | Kamath | C08F 6/006 526/86 |
| 4,910,074 A | 3/1990 | Fukawa et al. | |
| 4,952,652 A | 8/1990 | Nishino et al. | |
| 5,589,526 A | 12/1996 | Sienel et al. | |
| 6,124,409 A | 9/2000 | Ng et al. | |
| 2009/0159129 A1 | 6/2009 | Kataoka et al. | |
| 2009/0238867 A1 | 9/2009 | Jenkins et al. | |
| 2010/0229944 A1 | 9/2010 | Nishijima et al. | |

FOREIGN PATENT DOCUMENTS

| | | | | |
|---|---|---|---|---|
| CN | 1176974 | 3/1998 | | |
| CN | 101375409 | 2/2009 | | |
| CN | 101575274 | 11/2009 | | |
| CN | 101870854 | 10/2010 | | |
| DE | 2130273 | 4/1972 | | |
| EP | 259537 | 3/1988 | | |
| EP | 314132 | 3/1989 | | |
| EP | 1857500 | 11/2007 | | |
| EP | 1990840 | 12/2008 | | |
| EP | 2371898 | 10/2011 | | |
| EP | 2463919 | 6/2012 | | |
| JP | 55165910 | 12/1980 | | |
| JP | S57164106 | 10/1982 | | |
| JP | 60243114 | 12/1985 | | |
| JP | 02284905 | 11/1990 | | |
| JP | 04126726 | 4/1992 | | |
| JP | 0551404 | 3/1993 | | |
| JP | 0570676 | 3/1993 | | |
| JP | H09111035 | * | 4/1997 | ............. C08F 12/00 |
| JP | 09227611 | 9/1997 | | |
| JP | 11026791 | 1/1999 | | |
| JP | 2002069114 | 3/2002 | | |
| JP | 2003064114 | 3/2003 | | |
| JP | 2004002518 | 1/2004 | | |
| JP | 2004300243 | 10/2004 | | |
| JP | 2005054052 | 3/2005 | | |
| JP | 2006111862 | 4/2006 | | |
| JP | 2011140588 | 7/2011 | | |
| KR | 20090030729 | 3/2009 | | |
| KR | 10-2009-0035971 | * | 4/2009 | ............. H01L 31/048 |
| KR | 1020090035971 | 4/2009 | | |
| WO | 2007094445 | 8/2007 | | |
| WO | 2010029468 | 3/2010 | | |
| WO | 2010074394 | 7/2010 | | |
| WO | 2011016557 | 2/2011 | | |

OTHER PUBLICATIONS

Interplastic Corporation (Optimizing Initiator Systems for Cured-In-Place Pipe Infrastructure Repair, Corporation, 2007).*
Japanese Application No. 2013-550910, English translation of Office Action dated Oct. 19, 2015.
European Patent Application No. EP12702801.7, Notice of Opposition dated Jan. 4, 2016.
European Patent Application No. EP12702801.7, Notice of Opposition dated Dec. 15, 2015.
Japanese Patent Application No. JP2013550910, "Third Party Observation", Feb. 18, 2016, in Japanese.

* cited by examiner

*Primary Examiner* — Ling Choi
*Assistant Examiner* — Chun-Cheng Wang
(74) *Attorney, Agent, or Firm* — Kilpatrick Townsend & Stockton LLP

(57) ABSTRACT

The present invention relates to peroxide mixtures and in particular to peroxide mixtures that are suitable for the accelerated crosslinking of ethylene vinyl acetate.

14 Claims, 4 Drawing Sheets

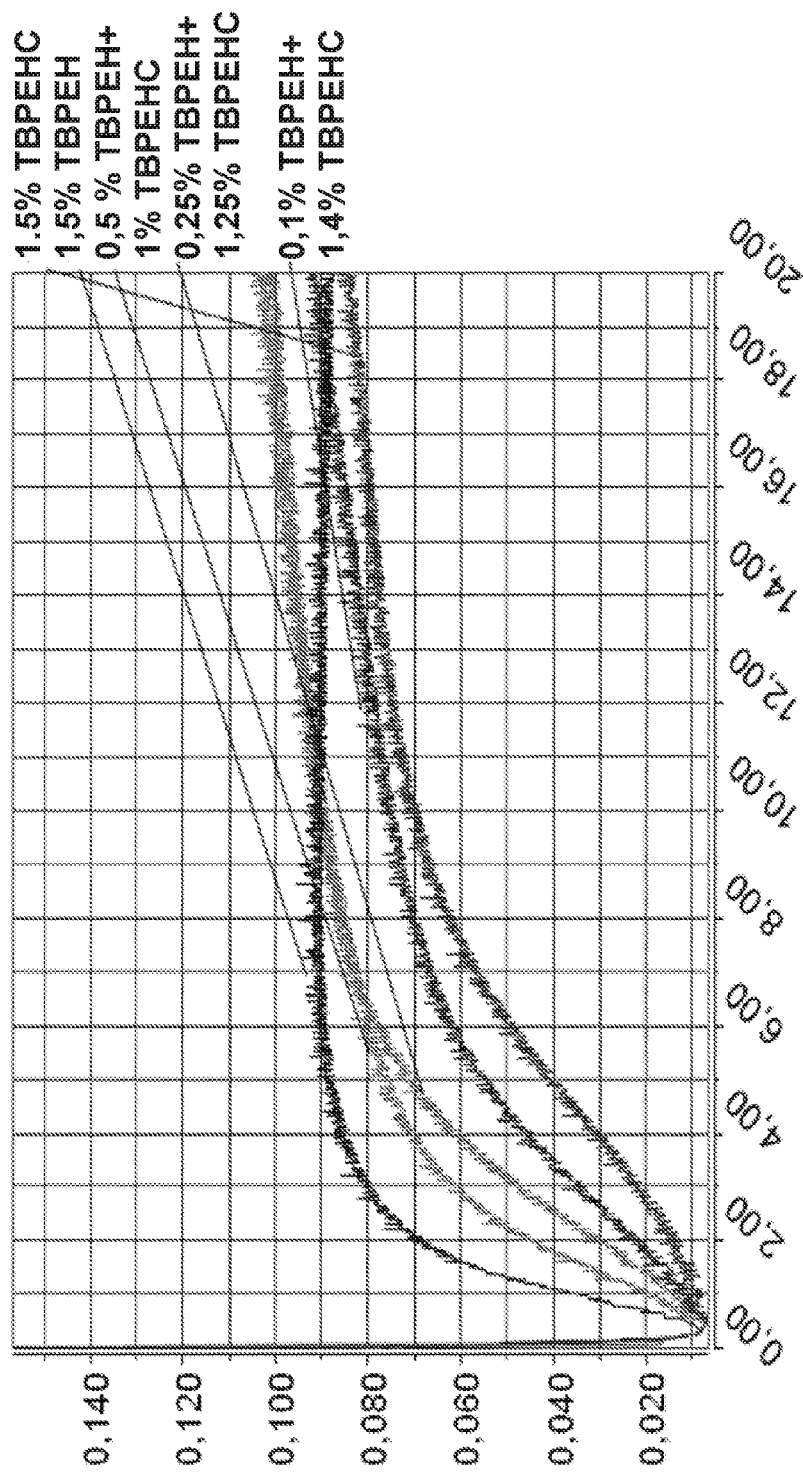
Figure 2: Measurement of the acceleration of the crosslinking speed by replacement of part of the TBPEHC by TBPEH with the aid of a Goettfert Visco-Elastograph.

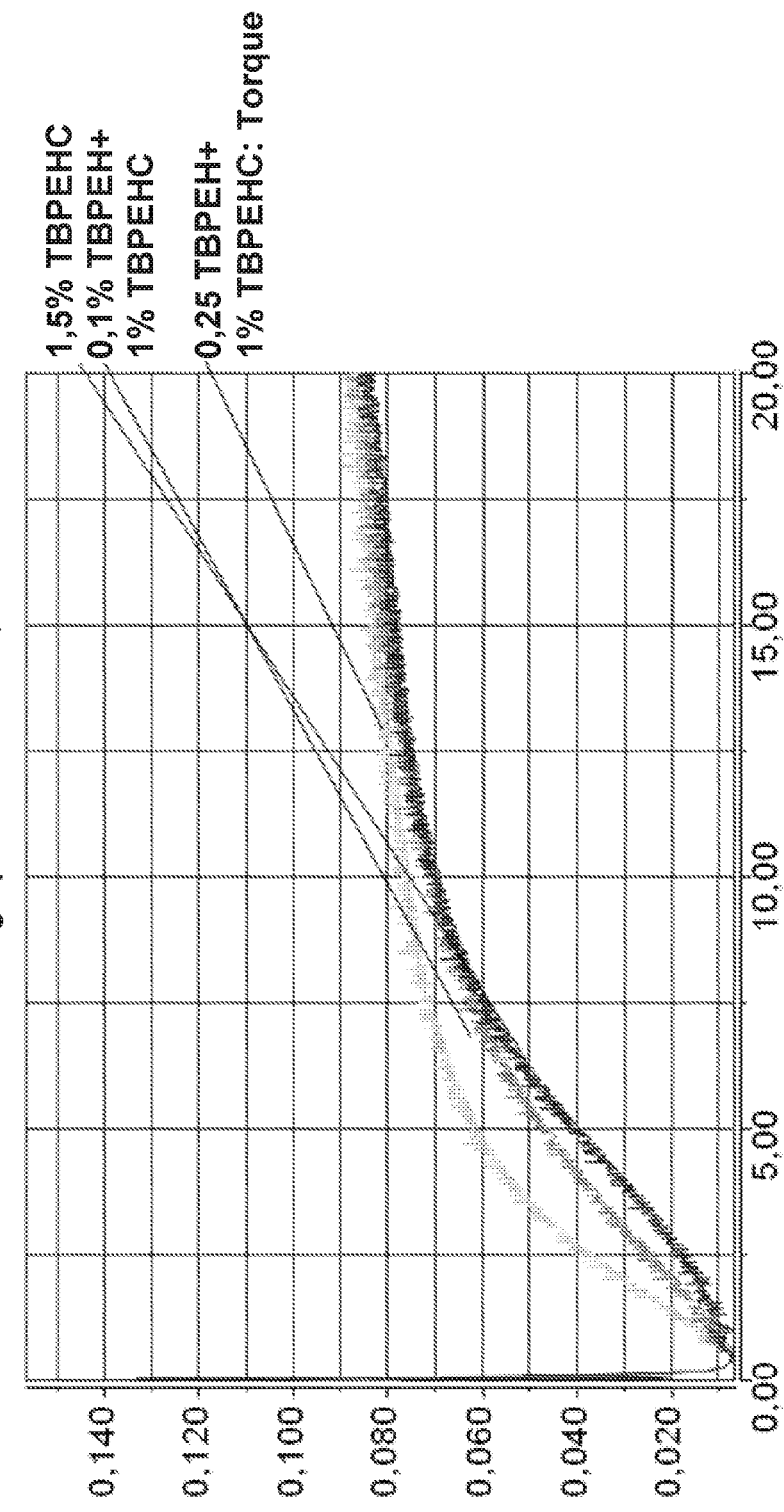
Figure 3: Measurements with reduced total peroxide amount as compared with the standard dose 1.5% TBPEHC.

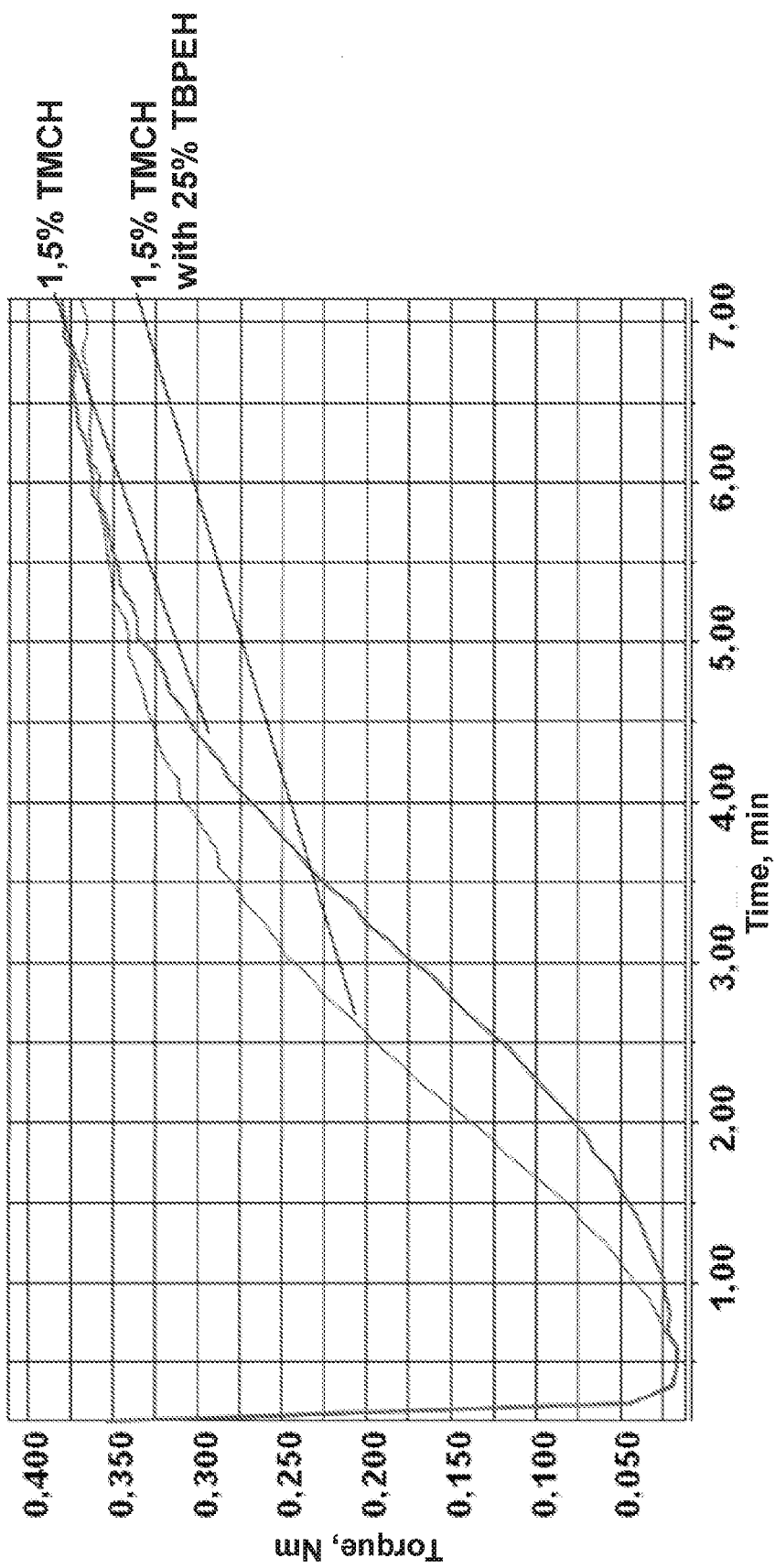
Figure 4: accelerating effect of TBPEH by blending a technically pure TMCH with 25% TBPEH

PEROXIDE BLENDS FOR CROSS-LINKING ETHYLENE VINYL ACETATE IN AN ACCELERATED MANNER

PRIOR RELATED APPLICATIONS

This application is a National Phase application of International Application No. PCT/EP2012/051555 filed Jan. 31, 2012, which claims priority to German Patent Application No. 10 2011 003 382.3 filed Jan. 31, 2011, each of which is incorporated herein by reference in its entirely.

The present invention relates to peroxide mixtures and in particular to peroxide mixtures that are suitable for the accelerated crosslinking of ethylene vinyl acetate.

In the peroxide crosslinking of polymers, such as polyolefins (LDPE, HDPE, LLDPE) or elastomers (EVA, EPDM, NBR, BR, SBR), thermally stable peroxides are used, which enable compounds to be produced by means of mixing units such as kneading machines and extruders without the occurrence of pre-crosslinking during the compounding process. The finished mixtures are then fed in granulate or powder form to the processing machines such as extrusion systems (for the production of hoses, profiles, films). These machines can already possess downstream equipment for crosslinking, for example ovens, salt baths or autoclaves, in which the profile is crosslinked at elevated temperature. For that purpose, the decomposition temperature of the peroxide must inevitably be exceeded significantly. Current practice refers to peroxides that have sufficient thermal stability for the compounding process and can also be stored and transported at room temperature.

A problem with the peroxides used hitherto is that, on the one hand, they must be sufficiently stable that they do not bring about premature crosslinking of the polymer while it is still in the granulate state or during shaping, for example during extrusion. On the other hand, the peroxides should at the desired time bring about crosslinking of the polymers at the lowest possible temperatures and at high speed.

It has now been found that those very requirements can be fulfilled using specific peroxide mixtures. The invention therefore relates to a peroxide mixture comprising
(i) at least one peroxyester of the formula

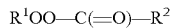

wherein $R^1$ and $R^2$ each independently represent an alkyl radical, and
(ii) at least one further peroxide other than (i).

It has been found that the peroxide mixtures according to the invention are stable and can accordingly be stored and transported at temperatures up to 50° C. and in particular at room temperature. They can also be mixed and processed with crosslinkable polymers, for example in a compounding process or in an extrusion process, without the occurrence of premature crosslinking. On the other hand, a high crosslinking speed and a high efficiency in terms of the degree of crosslinking are achieved with the peroxide mixtures according to the invention even at relatively low crosslinking temperatures, for example at from 120° C. to 150° C.

An important constituent of the peroxide mixture according to the invention is a peroxyester of the formula $R^1OO-C(=O)-R^2$ as component (i), wherein $R^1$ and $R^2$ each independently represent an alkyl radical.

Unless indicated otherwise herein, alkyl radical means a saturated hydrocarbon radical. Such an alkyl radical has preferably from 1 to 30, preferably from 1 to 12 and in particular from 1 to 6 carbon atoms. Alkyl radicals can be linear, branched or/and contain cyclic portions.

Preference is given to peroxyesters of the formula $R^1OO-C(=O)-R^2$ in which $R^2$ is a linear or branched, preferably a branched, alkyl radical having from 4 to 10 carbon atoms, in particular from 6 to 8 carbon atoms, and most preferably is 2-ethylhexanyl, and in which $R^1$ is a linear or branched, preferably a branched, alkyl radical having from 3 to 6 carbon atoms, in particular having from 4 to 5 carbon atoms, and most preferably is tert-butyl or tert-amyl, in particular tert-butyl.

The peroxyester is used in the peroxide mixture according to the invention as an organic peroxide that has the effect of accelerating crosslinking. Particularly preferably, component (i) comprises tert-butyl per-2-ethylhexanoate (TBPEH) or tert-amyl per-2-ethylhexanoate (TAPEH):

Peroxyesters:

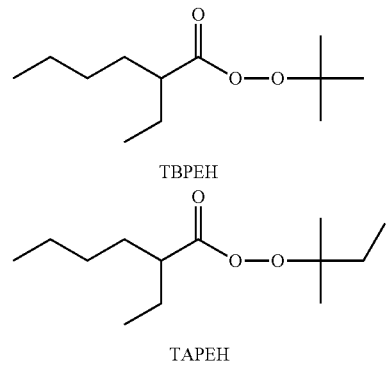

Particularly advantageous mixtures are obtained when component (i) comprises TBPEH.

The proportion of component (i) in the peroxide mixture is preferably from 1 to 99 wt. %, preferably from 2 to 40 wt. %, more preferably from 3 to 30 wt. %, yet more preferably from 5 to 20 wt. % and particularly preferably from 7 to 15 wt. %, in each case based on the total weight of peroxides in the peroxide mixture.

In addition to the peroxyester that has the effect of accelerating crosslinking as component (i), the peroxide mixtures according to the invention comprise as component (ii) at least one further peroxide other than component (i). Component (ii) preferably comprises at least one monoperoxycarbonate, alkyl peroxide, cyclic peroxide, perketal or/and hydroperoxide.

Preferably, component (ii) comprises a monoperoxycarbonate of the formula $R^6OO-C(=O)O-R^7$, wherein $R^6$ and $R^7$ each independently of the other represent an alkyl radical, in particular a $C_1$-$C_{30}$-alkyl radical, yet more preferably a $C_1$-$C_{12}$-alkyl radical. $R^7$ is particularly preferably a methyl or tert-butyl radical. Tert-butylperoxy (2-ethylhexyl)-carbonate (TBPEHC) is most preferably used as the monoperoxycarbonate.

Monoperoxycarbonates:

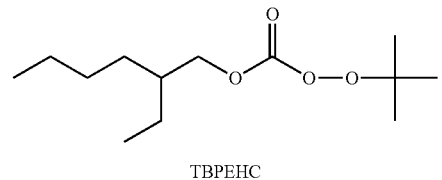 [SMILES: CCCCC(CC)COC(=O)OOC(C)(C)C]

Likewise preferably, component (ii) comprises at least one alkyl peroxide of the formula $R^3OO-R^4-OOR^5$ or of the formula $R^3OOR^5$, wherein $R^3$ and $R^5$ each independently represent an alkyl radical and $R^4$ represents an alkylene radical or an alkynylene radical.

$R^3$ and $R^5$ preferably represent a $C_1$-$C_{30}$-alkyl radical, in particular a $C_1$-$C_{12}$-alkyl radical and yet more preferably a $C_1$-$C_6$-alkyl radical and in particular methyl, ethyl, propyl, isopropyl, butyl, isobutyl or tert-butyl, most preferably methyl or tert-butyl.

$R^4$ preferably represents an alkylene or alkynylene radical having from 1 to 30, in particular from 2 to 12 and yet more preferably from 4 to 8 carbon atoms. Particularly preferred alkyl peroxides are 2,5-dimethyl-2,5-di(tert-butylperoxy)-hexane (DHBP), di(tert-butyl) peroxide (DTBP) or 2,5-dimethyl-2,5-di(tert-butylperoxy)-hexyne-3 (DYBP).

Also preferably, component (ii) comprises at least one cyclic peroxide, in particular of the formula

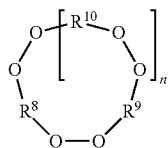

wherein $R^8$, $R^9$ and $R^{10}$ each independently of the others represent an alkylene radical and n represents an integer from 0 to 5, in particular from 0 to 2. Particularly preferably n is 0, yielding a 6-membered ring, or n=1, yielding a 9-membered ring. The alkylene radicals have preferably from 1 to 30, preferably from 1 to 12 and in particular from 1 to 8 carbon atoms. They can be linear or branched.

There is particularly preferably used as the cyclic peroxide 3,3,6,6,9,9-hexamethyl-1,2,4,5-tetraoxacyclononane (HMCN) or 3,3,5,7,7-pentamethyl-1,2,4-trioxepan (cyclic MEKP)

Cycl. Peroxides:

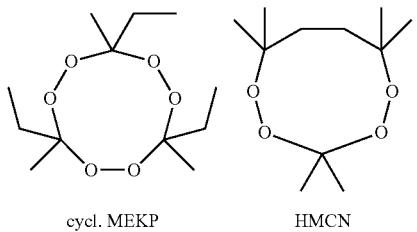

cycl. MEKP　　　　HMCN

Also preferably, component (ii) comprises at least one perketal, in particular of the formula

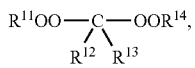

wherein $R^{11}$ and $R^{14}$ each independently represent an alkyl radical and $R^{12}$ and $R^{13}$ each independently represent a hydrocarbon radical which can contain one or more heteroatoms, or wherein $R^{12}$ and $R^{13}$ together form a cyclic radical. Preferably, $R^{11}$ and $R^{14}$ are each independently a $C_1$-$C_{30}$ radical, in particular a $C_1$-$C_6$ radical and yet more preferably a methyl or tert-butyl radical. $R^{12}$ and $R^{13}$ are preferably each independently alkyl radicals, in particular $C_1$-$C_{30}$ radicals, more preferably $C_1$-$C_6$ radicals and yet more preferably methyl, butyl or tert-butyl radicals. Also preferably, $R^{12}$ and/or $R^{13}$ each independently represent a radical which contains heteroatoms, for example a radical which contains an ester group. The radicals $R^{12}$ and $R^{13}$ can in particular contain one or more, preferably from 1 to 4, yet more preferably from 1 to 2 heteroatoms selected from O, N, S, P.

Particularly preferred as the perketal are 1,1-bis(tert-butylperoxy)cyclohexane (CH), 1,1-bis(tert-butylperoxy)-3,3,5-trimethylcyclohexane (TMCH), 2,2-di(tert-butylperoxy)butane (BU); ethyl 3,3-di(tert-butylperoxy)-butanoate (EBU) or 4,4-bis-(tert-butylperoxy)-valeric acid n-butyl ester (NBV)

Perketals:

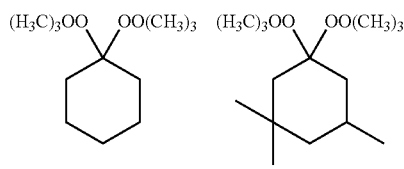

CH　　　　TMCH

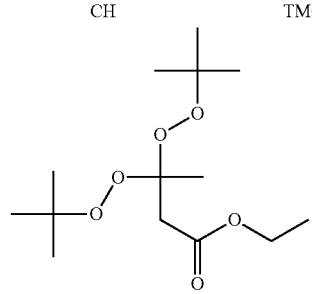

Ethyl 3,3-di(tert-butylperoxy)-butanoate

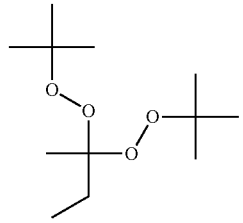

2,2-di(tert-butylperoxy)butane

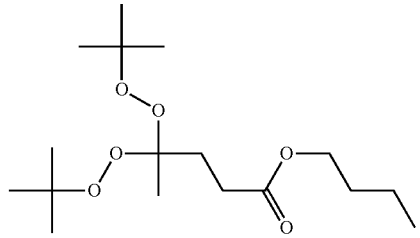

4,4-bis(tert-butylperoxy)-valeric acid n-butyl ester

Also preferably, component (ii) comprises a hydroperoxide, in particular of the formula $R^{15}OOH$, wherein $R^{15}$ represents an alkyl radical. $R^{15}$ is preferably a $C_1$-$C_{30}$-alkyl radical, yet more preferably a $C_1$-$C_6$-alkyl radical and in particular methyl or tert-butyl.

The proportion of component (ii) in the peroxide mixture is preferably from 1 to 99 wt. %, preferably from 60 to 98 wt. %, more preferably from 70 to 97 wt. %, yet more preferably from 80 to 95 wt. % and particularly preferably from 85 to 93 wt. %.

Particular preference is given to combinations of tert-butyl per-2-ethylhexanoate (TBPEH) with at least one further peroxide selected from tert-butyl (2-ethylhexyl)carbonate (TBPEHC), 2,5-dimethyl-2,5-di(tert-butylperoxy)-hexane (DHBP) or/and 1,1-bis(tert-butylperoxy)-3,3,5-trimethyl-cyclohexane (TMCH). Particular preference is given according to the invention to a peroxide mixture comprising a combination of tert-butyl per-2-ethylhexanoate (TBPEH) and tert-butyl (2-ethylhexanoate)carbonate (TBPEHC).

Most preferred are mixtures comprising from 5 to 35 wt. % TBPEH and from 65 to 95 wt. % TBPEHC, preferably from 5 to 15 wt. % TBPEH and from 85 to 95 wt. % TBPEHC, in particular from 8 to 12 wt. % TBPEH and from 88 to 92 wt. % TBPEHC. Such mixtures, unlike technically pure TBPEH, can be transported and stored, for example, at room temperature.

The onset temperatures of the mixtures according to the invention are preferably at least 10° C., more preferably at least 15° C. and yet more preferably at least 20° C. higher than the onset temperatures of the peroxide of component (i) alone.

Thus, for example, the onset temperature of pure TBPEH, which is about 60° C., is increased to about 80° C. in a mixture of 15 wt. % TBPEH and 85 wt. % TBPEHC.

Furthermore, with the mixture according to the invention it is possible to obtain an acceleration of the crosslinking of polymers as compared with the use of peroxides of component (ii). A significant acceleration of the crosslinking reaction when using mixtures of TBPEH and TBPEHC as compared with pure TBPEHC is shown, for example, in FIG. 2. In addition, an increase in the crosslinking density (that is to say the degree of crosslinking) as compared with the use of the pure components (i) or (ii) can be obtained with the mixtures according to the invention.

The mixtures according to the invention, and in particular a mixture of TBPEH and TBPEHC, accordingly combine the advantageous properties of the individual components, the disadvantages of the individual components (that is to say, for example, premature crosslinking by the component having an accelerating effect, or long reaction time of component (ii)) being avoided at the same time.

Components (i) and (ii) of the peroxide mixture according to the invention are preferably organic peroxides. Peroxides of components (i) and/or (ii) can preferably be liquid, pasty or in the form of a solid.

The mixing ratio of the peroxide components can be varied according to the desired crosslinking speeds. Each of components (i) and (ii) is preferably used in an amount of at least 1 wt. %, more preferably at least 5 wt. %, and up to 99 wt. %, preferably up to 95 wt. %, based on the total weight of peroxides in the peroxide mixture. In a preferred embodiment, the peroxyester as component (i) is present in an amount of from 5 wt. % to 15 wt. % and the peroxide of component (ii) is present in a proportion of from 85 to 95 wt. %.

The peroxide mixtures can also comprise further auxiliary substances such as diluents, for example phlegmatising agents. The peroxide mixture according to the invention preferably comprises coagents, for example triallyl cyanurate, triallyl isocyanurate or the like, or unsaturated acrylates, in particular dimeric or trimeric unsaturated acrylates. Antioxidants, in particular phenolic antioxidants such as pentaerythritol or tetrakis(3-(3,5-di-tert-butyl-4-hydroxyphenyl)propionate), can further be present. Peroxide mixtures can also comprise adhesion promoters, in particular silanes such as vinyltrimethoxysilane (VTMO). Further diluents or additives, in particular with regard to the intended use, can also be added to the peroxide mixtures according to the invention.

The peroxide mixture according to the invention is suitable in particular for the crosslinking of polymers. Polymers such as polyolefins, in particular polyethylene or polypropylene and more preferably low-density polyethylene (LDPE), high-density polyethylene (HDPE) or linear low-density polyethylene (LLDPE), are preferably crosslinked. The peroxide mixture is further suitable also for the crosslinking of elastomers, such as ethylene vinyl acetate (EVA), ethylene-propylene-diene rubber (EPDM), nitrile-butadiene rubber (NBR), butadiene rubber (BR) or styrene-butadiene rubber (SBR). Particular preference is given to the use of the peroxide mixture according to the invention for the crosslinking of ethylene vinyl acetate.

According to the invention, homopolymers, formed of a single monomer, or copolymers, formed of two or more different monomers, can be crosslinked. The polymer to be crosslinked is particularly preferably an ethylene vinyl acetate copolymer comprising a proportion of ethylene, in particular a proportion of ethylene of from 40 to 90 wt. %, more preferably from 60 to 85 wt. % and yet more preferably from 65 to 70 wt. %, and a proportion of vinyl acetate, in particular a proportion of vinyl acetate of from 10 to 60 wt. %, more preferably from 15 to 40 wt. % and yet more preferably from 30 to 35 wt. %, in each case based on the total weight of the EVA polymer. Such ethylene vinyl acetate vinyl acetate copolymers have in particular high resistance to weathering, high transparency and excellent light transmission.

An ethylene vinyl acetate polymer that is preferably used is, for example, Elvax PV1400Z from DuPont.

Owing to the properties of the peroxide mixture according to the invention, the crosslinking of the polymers, and in particular the crosslinking of ethylene vinyl acetate, can be carried out at relatively low temperatures, in particular at a temperature in the range of from 80 to 150° C., preferably in the range of from 120 to 150° C. and yet more preferably in the range of from 125 to 140° C.

A particularly preferred field of application of the peroxide mixture according to the invention is the crosslinking of ethylene vinyl acetate films in the encapsulation of silicon wafers in solar cell production. As well as comprising peroxides, the prefabricated compounds for the film production can additionally comprise further substances, such as silanes, coagents and various stabilisers. The production temperature of the compounds, for example, in the extruder depends on the softening point of the type of EVA used. Hitherto, only peroxides having a significantly higher stability than the softening point of the EVA were used, in order to avoid pre-crosslinking problems but also to permit transport at ambient temperature. Films as semi-finished products are then extruded from the granulates and used in so-called vacuum laminators at temperatures of approximately from 150 to 180° C. for the sheathing of silicon wafers, on the one hand, and the bonding thereof to the glazing on the front and rear, on the other hand. Particular requirements that are made of the encapsulation material concern: light transmission, hydrolytic stability, no blistering, no tendency to yellowing, as well as scratch resistance under load and heat.

The present invention allows the end user, owing to an optimised choice of peroxide combinations, to reduce the vacuum lamination time significantly or to lower the crosslinking temperature. The peroxide mixtures according to the invention which have been developed therefor, while having a considerably higher crosslinking speed, additionally exhibit a higher efficiency in terms of the degree of crosslinking, so that smaller peroxide doses are additionally possible. The processing reliability in the production of films is nevertheless ensured. No pre-crosslinking could be detected.

Furthermore, mixtures, preferably with 10% TBPEH and 90% TBPEHC, can still be transported at ambient temperature.

A typical procedure for the production of crosslinked, shaped polymers is as follows:

A premixture comprising a crosslinkable polymer and a peroxide mixture according to the invention is first prepared. The peroxide mixture according to the invention can thereby be added in liquid, dissolved, suspended or solid form to a polymer, in particular ethylene vinyl acetate. The premixture is preferably processed in mixing units to form compounds in which the constituents are homogeneously mixed. Suitable mixing units are, for example, kneading machines or extruders. It is important here than no pre-crosslinking occurs during the compounding operation.

It is yet more preferable first to form a masterbatch comprising a peroxide mixture according to the invention and a crosslinkable polymer, the peroxide mixture being present in a relatively high concentration, for example from 0.5 wt. % to 75 wt. %, more preferably from 10 wt. % to 50 wt. %, based on the total weight of the masterbatch. Simple mixers, such as paddle mixers or tumbling mixers, or compounding systems, such as extruders, in particular twin-screw extruders or kneading machines, can be used to produce the masterbatch. A premixture suitable for shaping can then be formed by adding the masterbatch to a further polymer, in particular in powder or granulate form.

Further additives, such as stabilisers, adhesion promoters, coagents, etc., can also be added to the masterbatch or/and to the premixture. Particularly suitable are coagents such as triallyl cyanurate, triallyl isocyanurate or dimeric or trimeric unsaturated acrylates, antioxidants, in particular phenolic antioxidants such as pentaerythritol, tetrakis(3-3,5-di-tert-butyl-4-hydroxyphenyl)propionate, or adhesion promoters, in particular silanes such as vinyltrimethoxysilane (VTMO).

The peroxide mixture according to the invention can be added to the polymer, in particular to ethylene vinyl acetate, as an already premixed peroxide mixture or in the form of the individual components. The addition of individual peroxides or as an already premixed peroxide mixture preferably takes place in simple mixers, such as paddle mixers or tumbling mixers, or in other compounding systems, such as twin-screw extruders or kneading machines. The premixtures comprising the peroxide according to the invention and a crosslinkable polymer, in particular crosslinkable ethylene vinyl acetate, are preferably formed in granulate or powder form. These compounds can then be fed to a shaping machine, such as a film extrusion system. The peroxide concentration in such premixtures is preferably from 0.1 to 5 wt. % peroxide, based on the weight of the polymer to be crosslinked.

It is, however, also possible not to form premixtures first but to add the individual peroxides or the peroxide mixture according to the invention directly in the shaping process. The peroxides can, for example, be added by way of various metering devices, such as injection, to the extruder barrel or by metering into the intake zone during the extrusion.

In addition to the peroxides, further additives, such as coagents, in particular triallyl (iso)cyanurate, antioxidants, in particular phenolic antioxidants, stabilisers, in particular UV stabilisers, or/and silane can be added.

The invention therefore relates further to a process for the production of a crosslinked polymer, in particular of an ethylene vinyl acetate, comprising
(i) mixing a peroxide mixture according to the invention with a crosslinkable polymer, in particular with a crosslinkable ethyl vinyl acetate,
(ii) shaping the mixture of crosslinkable polymer and peroxides, and
(iii) increasing the temperature of the mixture in order to bring about crosslinking of the shaped polymer.

The ethyl vinyl acetate that is to be crosslinked according to the invention is preferably an ethyl vinyl acetate having a proportion of vinyl acetate incorporated by polymerisation of >15%.

In step (ii), the mixture of crosslinkable polymer and peroxides is subjected to a shaping process, such as extrusion for the formation of films, hoses or gaskets, a transfer moulding process or/and an injection moulding process. In a subsequent step, the polymer in the shaped article can then be crosslinked by increasing the temperature of the mixture, in particular to a range of from 120 to 150° C.

In a particularly preferred embodiment, the process according to the invention is used for the crosslinking of ethylene vinyl acetate films, in particular in the encapsulation of solar cell wafers in the vacuum lamination process. By accelerating crosslinking by the addition of a peroxyester according to component (i) of the peroxide mixture according to the invention, cycle times in the vacuum lamination process can be shortened considerably or the conventional crosslinking temperatures, depending on the peroxide mixture used, can be lowered significantly. The addition of tert-butyl per-2-ethylhexanoate (TBPEH) is particularly preferred.

The invention is explained further by the accompanying figures and the following examples.

FIG. 2 shows the measurement of the acceleration of the crosslinking speed by replacement of part of the TBPEHC by TBPEH with the aid of a Goettfert Visco-Elastograph.

FIG. 3 shows measurements with a reduced total amount of peroxide as compared with the standard dose of 1.5% TBPEHC.

FIG. 4 shows an accelerating effect of TBPEH by blending technically pure TMCH with 25% TBPEH.

EXAMPLES

Example 1

Figure 1:
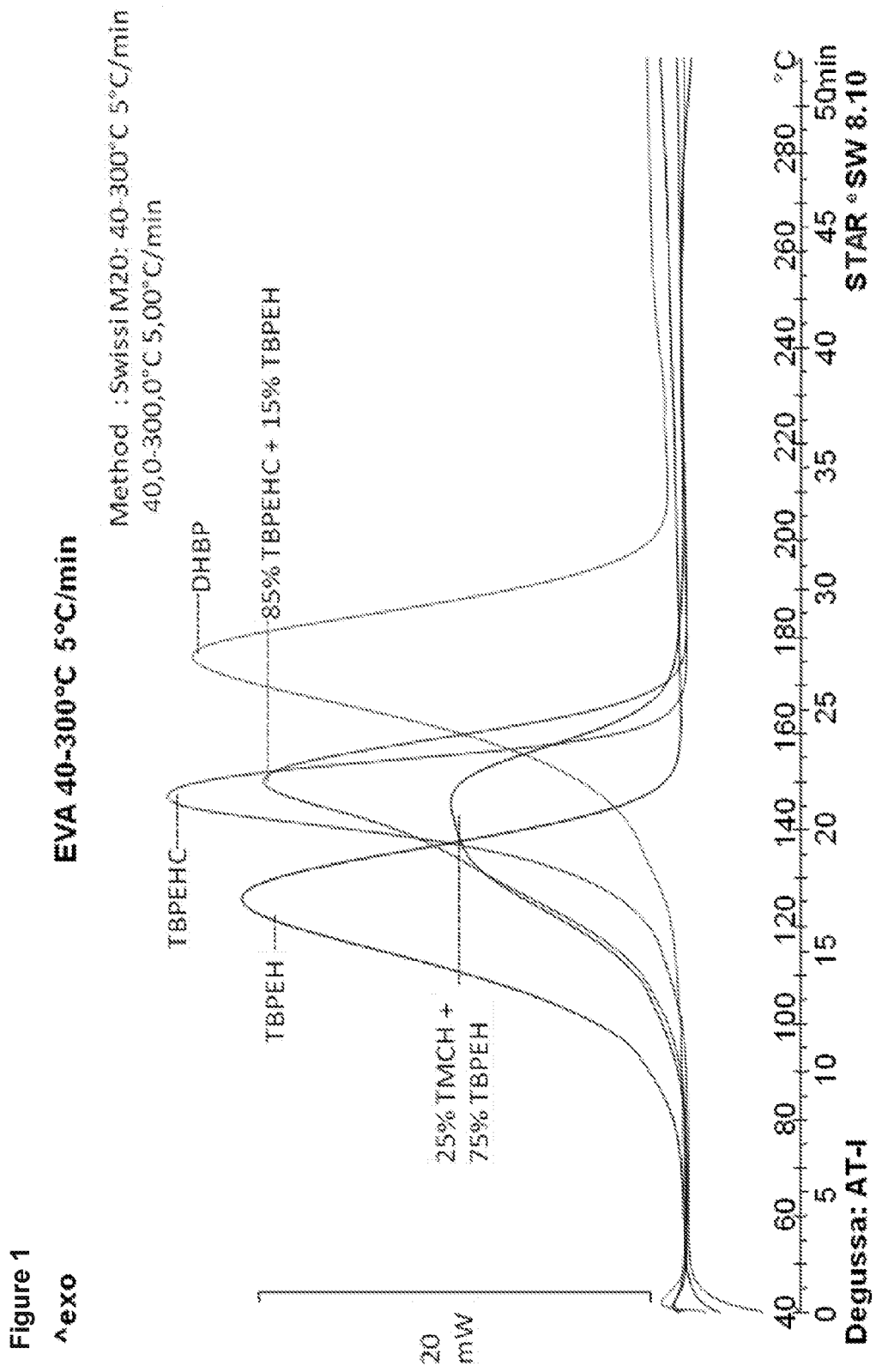
FIG. 1 shows the decomposition kinetics of peroxides and peroxide mixtures, measured by means of a differential thermal analysis device.

For the development of the present invention, a 30D/25 mm single-screw extruder from Collin was used to produce the compounds. The extrusion temperature of the premixtures of EVA/peroxide (blending in the mixing vessel 1 ltr. via the head) was about 80-90° C. at 60 revolutions/min. The residence time could be so adjusted that no pre-crosslinking occurs or the content of TBPEH could be chosen to be sufficiently low (15% with 85% TBPEHC, or 25% with 75% TMCH) that no pre-crosslinking occurs, or an increase in the viscosity during the extrusion operation is noticeable.

The extrudate was then comminuted in a granulator. The granulate was measured at 130° C. in a rheometer of the Goettfert-Visco-Elastograph type and the crosslinking time and, indirectly via the achieved torque, the degree of crosslinking obtained were evaluated.

The polymer used was a frequently used encapsulation-type polymer from DuPont, Elvax PV1400.

In order additionally to check the decomposition kinetics of accelerated peroxide mixtures, a differential thermal analysis device (DSC) from Mettler was used. The results are shown in FIG. 1.

Method: Heating rate 5° C./min, measuring range 40-300° C., gold-plated closed high-pressure crucible.

The determined onset temperatures are:
TBPEH about 60° C.
TBPEHC about 90° C.
85% TBPEHC+15% TBPEH about 80° C.
75% TMCH+25% TBPEH about 80° C.
DHBP about 90° C.

Example 2

By replacing part of the 1.5% total peroxide dose TBPEHC by 0.1, 0.25 and 0.5% TBPEH respectively, it was possible to measure a significantly quicker crosslinking reaction and, in addition, an increase in the crosslinking density (degree of crosslinking) via the torque, as is shown in FIG. 2.

Example 3

It is noticeable that peroxide combinations with a total dose of 1.1%, consisting of 1% TBPEHC+0.1% TBPEH, exhibit the same effectiveness (torque) and crosslinking speed as 1.5% TBPEHC. In that respect, a significant potential saving in terms of peroxide is possible (0.4%) (see FIG. 3).

A combination of 1% TBPEHC and 0.25% TBPEH additionally brings about a quicker crosslinking reaction with the same effectiveness.

The invention claimed is:

1. A peroxide mixture comprising: 3-30 wt % of t-butyl-per-2-ethylhexanoate (TBPEH); and 70-97 wt % of tert-butylperoxy(2-ethylhexyl)carbonate (TBPEHC) based on the total weight of the peroxide mixture.

2. A method of crosslinking polymers comprising using the peroxide mixture of claim 1 to crosslink polymers.

3. The method of claim 2, wherein the polymer is ethylene vinyl acetate.

4. The method of claim 2, wherein the polymer is ethylene vinyl acetate; crosslinking the ethylene vinyl acetate to form a film, and, encapsulating a solar cell wafer with the film.

5. The method of claim 2, wherein the crosslinking takes place at a temperature in the range of from 120° C. to 150° C.

6. A process for the production of a crosslinked polymer, comprising:
   (i) mixing the peroxide mixture of claim 1 with a crosslinkable polymer;
   (ii) shaping the mixture of crosslinkable polymer and peroxides; and,
   (iii) increasing the temperature of the mixture in order to bring about crosslinking of the shaped polymer.

7. The process of claim 6, wherein the peroxide mixture is added in the form of a masterbatch with an amount by weight of from 0.5 wt. % to 75 wt. % to the crosslinkable polymer, in particular to a crosslinkable ethylene vinyl acetate.

8. The process of claim 6, wherein step (ii) is carried out in a shaping machine, in particular in a film extrusion system.

9. The process of claim 6, wherein the amount of added peroxide mixture of claim 1, based on the polymer, is from 0.1 to 5 wt. %.

10. A premixture comprising:
    (a) the peroxide mixture of claim 1; and,
    (b) a crosslinkable polymer.

11. The premixture of claim 10, wherein the premixture is present in granulate or/and powder form.

12. The premixture of claim 10 in the form of a masterbatch, wherein the content of peroxides is from 0.5 wt.% to 75 wt.%, based on the total weight of the premixture.

13. The premixture of claim 10, wherein the crosslinkable polymer is an ethylene vinyl acetate.

14. The process of claim 1, wherein the crosslinkable polymer is a crosslinkable ethylene vinyl acetate.

* * * * *